United States Patent [19]
Ogawa et al.

[11] Patent Number: 5,254,658
[45] Date of Patent: Oct. 19, 1993

[54] METHOD FOR THE PREPARATION OF BRANCHED ORGANOPOLYSILOXANE

[75] Inventors: Takuya Ogawa; Toshio Suzuki, both of Kanagawa, Japan

[73] Assignee: Dow Corning Japan, Ltd., Tokyo, Japan

[21] Appl. No.: 963,157

[22] Filed: Oct. 19, 1992

[30] Foreign Application Priority Data

Oct. 31, 1991 [JP] Japan .................. 3-286753

[51] Int. Cl.$^5$ .................................. C08G 77/04
[52] U.S. Cl. ........................... 528/37; 528/14
[58] Field of Search ................... 528/14, 37

[56] References Cited

U.S. PATENT DOCUMENTS 3,481,898 12/1969 Davies et al. ............... 260/46.5

OTHER PUBLICATIONS

Polymer Science U.S.S.R., vol. 10, 1968, Oxford, Great Britain, pp. 49-55, K. A. Andrianov et al. "Study of Polydimethylsiloxanes with Three- and Four- Functional Centres of Branching".

Polymer Science U.S.S.R. vol. 23, No. 6, Jun. 1982, Oxford, Great-Britain pp. 1562-1569, I. I. Tverdokhlebova et al. "Synthesis and Properties of Star-Shaped Polymethylphenyl iloxane".

H. Huang, et al., Polymer Bulletin, vol. 14, pp. 557-564 (1985).

Primary Examiner—Melvyn I. Marquis
Attorney, Agent, or Firm—William F. Boley

[57] ABSTRACT

The present invention is a method for the preparation of branched organopolysiloxane in which polysiloxane with the formula $SiO_2$ constitutes the branching center or branch origin and the terminal on only one side of diorganopolysiloxane is bonded to the branch origin wherein this bonding is exactly to the branch origin. Specifically, the method for preparation of branched polyorganosiloxane comprises the reaction of an alkali metal compound with a silanol-containing polysiloxane described by formula $$\{SiO_{4/2}\}_x \{R^1_2(OH)SiO_{\frac{1}{2}}\}_y \{R^1_3SiO_{\frac{1}{2}}\}_z \{RO_{\frac{1}{2}}\}_u,$$

wherein each $R^1$ is independently selected from a group consisting of C1-8 alkyls, haloalkyls, alkenyls, and aryls; R is selected from a group consisting of hydrogen atom and C1-8 alkyls; $2 \leq x \leq 500$; $2 \leq y+z+u \leq 150$; $2 \leq y$; $0 \leq z$; $0.3 \leq (y+z+u)/x \leq 3$; and $0 \leq u/(x+y+z) \leq 0.1$); by subsequent reaction with cyclic organopolysiloxane described by formula $$\{SiR^2R^3O\}_m,$$

where $R^2$ and $R^3$ are defined as for $R^1$ and $3 \leq m \leq 8$; and finally by endcapping with triorganomonohalosilane or protic acid.

21 Claims, No Drawings

METHOD FOR THE PREPARATION OF BRANCHED ORGANOPOLYSILOXANE

BACKGROUND OF INVENTION

The present invention relates to a method for the preparation of a novel branched organopolysiloxane. More specifically, the present invention relates to a method for the preparation of a novel branched organopolysiloxane in which the central branch region or element (i.e. the branch origin) is a polysiloxane unit represented by the formula $SiO_2$ and the branch moiety proper is a diorganopolysiloxane unit.

Numerous branched organopolysiloxanes have already been proposed and even commercialized. However, there are few reports relative to organopolysiloxane in which the central structure of the branch is a polysiloxane unit with the formula $SiO_2$. Moreover, many of these branched organopolysiloxanes reported to data are no more than the product of simply mixing and reacting $SiO_2$ component with diorganopolysiloxane component, and their structures are by no means clear. For example, the reaction of hydroxyl-terminated polydimethylsiloxane and tetraethyl silicate by the sol-gel process to produce polymer has been reported (H. Huang, et al., Polymer Bulletin, Volume 14, pp. 557-564 (1985)). However, a clear structure was not reported for this polymer, and both ends of the diorganopolysiloxane in this polymer are bonded to branch points. To date, there have been no reports of a so-called "star organopolysiloxane" in which polysiloxane with the formula $SiO_2$ constitutes the branch origin and only one side of the diorganopolysiloxane component is bonded to the branch origin wherein this bonding is exactly to the branch origin.

Accordingly, the present invention takes as its object the introduction of a method for the preparation of a branched organopolysiloxane in which polysiloxane with the formula $SiO_2$ constitutes the branching center or branch origin and only one terminal of the diorganopolysiloxane is bonded to the branch origin wherein this bonding is exactly to the branch origin.

DESCRIPTION OF INVENTION

In order to achieve the aforesaid object, the present invention introduces a method for the preparation of branched polyorganosiloxane, wherein said method comprises reacting an alkali metal compound with silanol-containing polysiloxane to form an alkali metal salt of the silanol-containing polysiloxane, the silanol-containing polysiloxane being described by formula (I)

$$\{SiO_{4/2}\}_x\{R^1{}_2(OH)SiO_{\frac{1}{2}}\}_y\{R^1{}_3SiO_{\frac{1}{2}}\}_z\{RO_{\frac{1}{2}}\}_u \qquad (I)$$

wherein each $R^1$ is independently selected from a group consisting of C1-8 alkyls, haloalkyls, alkenyls, and aryls; R is selected from a group consisting of hydrogen atom and C1-8 alkyl; $2 \leq x \leq 500$; $2 \leq y+z+u \leq 150$; $2 \leq y$; $0 \leq z$; $0.3 \leq (y+z+u)/x \leq 3$; and $0 \leq u/(x+y+z) \leq 0.1$); subsequently reacting the alkali metal salt of the silanol-containing polysiloxane with cyclic organopolysiloxane described by formula $$\{SiR^2R^3O\}_m,$$

where $R^2$ and $R^3$ are defined as for $R^1$ and $3 \leq m \leq 8$; and endcapping with triorganomonohalosilane or protic acid.

The starting silanol-containing polysiloxane (I) in the aforementioned preparative method can itself be prepared by methods known in the art. For example, (I) can be prepared by hydrolysis of SiH-containing organopolysiloxane represented by $$\{SiO_2\}_x\{R^1{}_2HSiO_{\frac{1}{2}}\}_y\{R^1{}_3SiO_{\frac{1}{2}}\}_z$$

in a suitable solvent in the presence of a basic catalyst or transition-metal catalyst. In specific terms, the use is recommended of a basic compound such as an alkali metal hydroxide or bicarbonate, i.e., sodium hydroxide, sodium bicarbonate, ect., or a transition-metal compound such as palladium/carbon, palladium acetate, platinum/carbon, and so forth.

Depending on the synthetic conditions for the starting material, the silanol-containing polysiloxane prepared as described above may contain up to 10% $\{RO_{\frac{1}{2}}\}$ group referred to the total number of constituent units excluding the $\{SiO_{4/2}\}$ unit.

This silanol-containing polysiloxane is then reacted with an alkali metal compound, optionally in a suitable solvent, to afford the alkali metal salt of the silanol containing-polysiloxane, which is subsequently reacted with cyclic diorganopolysiloxane. The solvent is not specifically restricted, but a solvent with an appropriate polarity is preferred due to the desirability of obtaining good dissolution of the starting material, the alkali metal salt product, and the branched organopolysiloxane final product. In some cases, good results are obtained through the use of a mixture of nonpolar solvent and polar solvent. Reaction solvents that satisfy these conditions are exemplified by aliphatic hydrocarbons such as pentane, hexane, heptane, and octane; aromatic hydrocarbons such as benzene, toluene, and xylene; ether solvents such as diethyl ether, dibutyl ether, diphenyl ether, dioxane, and tetrahydrofuran; ester solvents such as ethyl acetate and butyl acetate; ketone solvents such as acetone, methyl ethyl ketone, and methyl butyl ketone; halogenated solvents such as carbon tetrachloride, chloroform, trichloroethane, trichloroethylene, and tetrachloroethylene; acetonitrile; dimethylformamide; dimethyl sulfoxide; and hexamethylphosphoramide. However, the reaction solvent is not limited to the preceding.

The alkali metal compound used to convert the silanol group into its alkali metal salt is exemplified by the alkyl and aryl compounds of alkali metals such as lithium, sodium, potassium, and cesium and by the amide compounds of these metals. The methyl, ethyl, propyl, and butyl compounds of these alkali metals are generally preferred due to their ease of acquisition. Methyllithium and butyllithium are examples of preferred alkali metal compounds.

The resulting alkali metal salt of the silanol-containing polysiloxane reacted with cyclic diorganopolysiloxane in order to grow the branch moiety proper. This reaction is already known as the ring-opening polymerization of polysiloxane. The cyclic diorganopolysiloxane used here is not specifically restricted; however, cyclic trisiloxane, cyclic tetrasiloxane, and cyclic pentasiloxane are preferred from considerations of reactivity and facile control of the structure, and cyclic trisiloxane is particularly preferred.

This ring-opening polymerization reaction is stopped by the addition of triorganomonohalosilane or protic acid, which results in a triorganosilyl group (in which the halogen is removed from the added triorganomonohalosilane) or hydroxyl group bonded at each terminal of the branch moiety proper. This triorganomonohalosilane is also not specifically restricted, and need merely be a silane compound that contains 1 atom selected from the chlorine, bromine, iodine, and fluorine atoms. Chlorosilane is strongly preferred from the standpoints of economic efficiency and ease of acquisition. Other than the halogen atom, the silicon-bonded organic groups are exemplified by the organic groups provided above as examples of $R^1$. The protic acid, which is used to place the hydroxyl group at the end of the branch, may be any protic acid that can neutralize alkali metal silanolate to yield the hydroxyl group. This protic acid is exemplified by inorganic acids such as hydrochloric acid, sulfuric acid, nitric acid, phosphoric acid, and carbonic acid, and by organic acids such as acetic acid, propionic acid, and benzoic acid.

This reaction series can be run at room temperature, with cooling, or at elevated temperature, and this is completely dependent on the type of alkali metal compound and the type of cyclic diorganopolysiloxane used. The suitable temperature range for this reaction series is generally $-80°$ to $+200°$ C., and a more suitable temperature range is $-25°$ to $+160°$ C.

The branched organopolysiloxane constructed by the method in accordance with the present invention is represented by formula (II)

$$\{SiO_{4/2}\}_x\{R^1{}_2ASiO_{\frac{1}{2}}\}_y\{R^1{}_3SiO_{\frac{1}{2}}\}_z\{RO_{\frac{1}{2}}\}_u. \quad (II)$$

wherein each $R^1$ is independently selected from a group consisting of C1-8 alkyls, haloalkyls, alkenyls, and aryls; A is a group represented by formula $$-(OSiR^2R^3)_n-R^4,$$

$R^2$ and $R^3$ are defined as for $R^1$, $R^4$ is selected from a group consisting of C1-8 alkyls, haloalkyls, alkenyls, hydrogen atom, and hydroxyl group, and $1 \leq n \leq 1,000$; R is selected from a group consisting of hydrogen atom and C1-8 alkyls; $2 \leq x \leq 500$; $2 \leq y+z+u \leq 150$; $2 \leq y$; $0 \leq z$; $0 \leq u \leq 15$; $0.3 \leq (y+z+u)/x \leq 3.0$; and $0 \leq u/(y+z+u) \leq 0.1$.

To explain the preceding in greater detail, this organopolysiloxane contains x SiO$_2$ units in each molecule, and this fraction forms the centers or nuclei in the branched organopolysiloxane. x is at least 2 and in particular is at least 4. The size of x is not specifically restricted, but in general the resulting branched organopolysiloxane is insoluble in solvent when x exceeds 500, which substantially impairs handling. Values of $x \leq 100$ are preferred from the standpoint of processability.

The $R^1{}_2ASiO_{\frac{1}{2}}$ unit is another crucial moiety in the organopolysiloxane of the present invention, and the value of y specifies the number of such units in each molecule. Again, the size of y is not specifically restricted as long as it is at least 2, but y preferably has a value of at least 3 from the standpoint of obtaining a "branched configuration". The upper limit on y is 150: the synthesis of molecules in which y is greater than this value is highly problematic. The $R^1$ substituent is a group selected from alkyl, aryl, alkenyl, and haloalkyl; however, economic efficiency argues for a selection from methyl, phenyl, and vinyl.

A is diorganopolysiloxane with the following formula:

$$-(OSiR^2R^3)_n-R^4.$$

Its degree of polymerization n must be at least 1, but again this is not specifically restricted. The size of n determines the length of the "branch" moiety proper of the branch. When this is too large, the molecular weight of the overall organopolysiloxane becomes too large and the viscosity becomes very high, which degrades the processability. The preferred value of n for practical applications is 1 through 1,000. Within the individual molecule, the substituents $R^2$, $R^3$, and $R^4$ in the diorganopolysiloxane may be identical to each other or may differ from each other. $R^2$ and $R^3$ are groups selected from the groups provided above as examples of $R^1$, but they are preferably selected from methyl, phenyl, and vinyl based on economic efficiency. $R^4$ is preferably the hydrogen atom or hydroxyl group or the methyl or vinyl group.

The $R^1{}_3SiO_{\frac{1}{2}}$ unit is not an essential constituent element of the organopolysiloxane of the present invention, and z may therefore assume a value of 0. The number of branches, the size of the nucleus, and so forth in organopolysiloxane according to the present invention are controlled through this unit. Thus, the ratio $(y+z)/x$ determines nucleus size: smaller values of this ratio give a larger nucleus. For the same nucleus size, a larger number of branches will be present at smaller values of z. The upper limit for z is restricted due to the difficulty of synthesizing molecules in which $(y+z+u)$ exceeds 150.

The $RO_{\frac{1}{2}}$ group is a residual group that will be present in accordance with the purity of the starting material. Its proportion must be no more than 10% of the total number of constituent units excluding $\{SiO_{4/2}\}$ units.

As explained hereinbefore, organopolysiloxane prepared in accordance with the method of the present invention is a novel compound, and it is useful as a starting material or reinforcing component for silicone elastomers. It is also useful as an additive for improving the fluid properties of silicone fluids.

In addition, the novel organopolysiloxane (II) afforded by the present invention's preparative method is synthesized under conditions in which the structure is highly controlled.

The present invention is explained more specifically below through illustrative examples; however, the present invention is not limited to the examples.

EXAMPLE 1

23 g silanol-containing polysiloxane (weight-average molecular weight=900) with the average formula $\{Me_2(OH)SiO_{\frac{1}{2}}\}_{6.4}\{SiO_2\}_{4.0}$ was dissolved in 150 mL tetrahydrofuran and this was held on an ice bath at 0° C. To this solution was then added 107 mL of a 1.69 molar hexane solution of n-butyllithium over 1 hour. To the resulting reaction solution was added a tetrahydrofuran solution of hexamethylcyclotrisiloxane (160 g as hexamethylcyclotrisiloxane) and stirring was continued. The decline in hexamethylcyclotrisiloxane was monitored by gas chromatography, and the reaction of $\geq 95\%$ of the charge was confirmed. In order to terminate the reaction, 22 g dimethylvinylchlorosilane was subsequently added with stirring for an additional 1 hour.

After removal of the solid product by filtration, water-washing and drying afforded 170 g polymer (yield=86%) corresponding to $\{Me_2ASiO_{\frac{1}{2}}\}_{6.4}\{SiO_2\}_{4.0}$ (A=(OSiMe$_2$)$_{13}$Vi). The weight-average molecular weight as measured by gel permeation chromatography was 6,900, and the dispersivity was 1.5. Quantitative analysis of the vinyl group at the terminals of the branch chains gave a value of 2.7% (calculated=2.5%).

The following data were obtained by 1H-NMR (ppm, in deuterochloroform, CHCl₃ reference (7.24 ppm)).
- 0–0.2 (84H, multi)
- 5.7–5.8 (1H, q)
- 5.9–6.0 (1H, q)
- 6.1–6.2 (1H, q)

The following data were obtained by 29Si-NMR (ppm, in deuterochloroform, TMS reference).
- −4.1 (Si-Vi)
- −18 to −23 (Si-Me₂)
- −105 to −112 (SiO₂)

EXAMPLE 2

The material $\{Me_2ASiO_{\frac{1}{2}}\}_{6.4}\{SiO_2\}_{4.0}$ (A=-(OSiMe₂)₁₃Me) was synthesized in a yield of 89% by the reaction described in Example 1, but in this case using 20 g trimethylchlorosilane in place of the dimethylvinylchlorosilane. The average molecular weight was 6,800.

EXAMPLE 3

The material $\{Me_2ASiO_{\frac{1}{2}}\}_{6.4}\{SiO_2\}_{4.0}$ (A=-(OSiMe₂)₁₂OH) was synthesized in a yield of 81% by the reaction described in Example 1, but in this case using 11 g acetic acid in place of the dimethylvinylchlorosilane. The average molecular weight was 6,500.

EXAMPLE 4

The material $\{Me_2ASiO_{\frac{1}{2}}\}_{6.4}\{SiO_2\}_{4.0}$ (A=-(OSiMe₂)₂₅Vi) was synthesized in a yield of 90% by the reaction described in Example 1 by changing the addition of the tetrahydrofuran solution of hexamethylcyclotrisiloxane to 320 g (as hexamethylcyclotrisiloxane). The average molecular weight was 12,500.

EXAMPLE 5

The material $\{Me_2ASiO_{\frac{1}{2}}\}_{12}\{SiO_2\}_{10}$ (A=-(OSiMe₂)₁₃Vi) was synthesized in a yield of 88% by the reaction described in Example 1, but in the present case starting from 25 g of $\{Me_2(OH)SiO_{\frac{1}{2}}\}_{12}\{SiO_2\}_{10}$ (weight-average molecular weight=1,600). The average molecular weight was 13,000.

EXAMPLE 6

The material $\{Me_2ASiO_{\frac{1}{2}}\}_{6.4}\{SiO_2\}_{4.0}\{Me_3SiO_{\frac{1}{2}}\}_{0.4}$ (A=(OSiMe₂)₁₃Vi) was synthesized in a yield of 88% by the reaction described in Example 1, but in the present case starting from 23 g $\{Me_2(OH)SiO_{\frac{1}{2}}\}_{6.4}\{SiO_2\}_{4.0}\{Me_3SiO_{\frac{1}{2}}\}_{0.4}$ (weight-average molecular weight=800). The average molecular weight was 5,900.

EXAMPLE 7

The material $\{Me_2ASiO_{\frac{1}{2}}\}_{6.4}\{SiO_2\}_{4.0}$ (A=O(SiPh₂O)₁₂SiMe₂Vi) was synthesized in a yield of 61% by the reaction described in Example 1, but in the present case using a reaction temperature of 160° C., a reaction time of 15 hours, and a diphenyl ether solution of hexaphenylcyclotrisiloxane (428 g as hexaphenylcyclotrisiloxane) in place of the tetrahydrofuran solution of hexamethylcyclotrisiloxane. The average molecular weight was 16,500.

EXAMPLE 8

The material $\{Me_2ASiO_{\frac{1}{2}}\}_{6.4}\{SiO_2\}_{4.0}$ (A=O(SiMe(C₂H₄CF₃)O)₁₂SiMe₂Vi) was synthesized in a yield of 80% by the reaction described in Example 1, but in the present case using 337 g 1,3,5-trimethyl-1,3,5-tris(3,3,3-trifluoropropyl)cyclotrisiloxane in place of the tetrahydrofuran solution of hexamethylcyclotrisiloxane. The average molecular weight was 9,900.

The following data were obtained by 1H-NMR (ppm, in acetone-d6, CH₃COCH₃ reference (2.04 ppm)).
- 0.2–0.3 (48H, multi)
- 0.8–0.9 (24H, multi)
- 2.1–2.3 (24H, multi)
- 5.4–6.2 (3H, multi)

The following data were obtained by 29 Si-NMR (ppm, in acetone-d6, TMS reference).
- −2.2 (Si-Vi)
- −20.0 (Si-Me)
- −22.1 (Si-C₂H₄CF₃)
- −106 to −112 (SiO₂)

EXAMPLE 9

The material $\{Me_2ASiO_{\frac{1}{2}}\}_{6.4}\{SiO_2\}_{4.0}\{MeO\}_{0.3}$ (A=(OSiMe₂)₁₃Vi) was synthesized in a yield of 90% by the reaction described in Example 1, but in the present case starting from 23 g $\{Me_2(OH)SiO_{\frac{1}{2}}\}_{6.4}\{SiO_2\}_{4.0}\{MeO\}_{0.3}$ (weight-average molecular weight=900). The average molecular weight was 7,000.

We claim:

1. A method for the preparation of branched polyorganosiloxane, wherein said method comprises reacting an alkali metal compound with a silanol-containing polysiloxane to form an alkali metal salt of the silanol-containing polysiloxane, the silanol-containing polysiloxane being described by formula $$\{SiO_{4/2}\}_x\{R^1_2(OH)SiO_{\frac{1}{2}}\}_y\{R^1_3SiO_{\frac{1}{2}}\}_z\{RO_{\frac{1}{2}}\}_u,$$

wherein each $R^1$ is independently selected from a group consisting of C1–8 alkyls, haloalkyls, alkenyls, and aryls; R is selected from a group consisting of hydrogen atom and C1–8 alkyls; $2 \leq x \leq 500$; $2 \leq y+z+u \leq 150$; $2 \leq y$; $0 \leq z$; $0 \leq u \leq 15$; $0.3 \leq (y+z+u)/x \leq 3$; and $0 \leq u/(x+y+z) \leq 0.1$); subsequently reacting the alkali metal salt of the silanol-containing polysiloxane with cyclic organopolysiloxane described by formula $$\{SiR^2R^3O\}_m,$$

where $R^2$ and $R^3$ are defined as for $R^1$ and $3 \leq m \leq 8$, and endcapping with triorganomonohalosilane or protic acid to form a branched organopolysiloxane described by formula $$\{SiO_{4/2}\}_x\{R^1_2ASiO_{\frac{1}{2}}\}_y\{R^1_3SiO_{\frac{1}{2}}\}_z\{RO_{\frac{1}{2}}\}_u,$$

wherein each $R^1$ is independently selected from a group consisting of C1–8 alkyls, haloalkyls, alkenyls, and aryls; A is a group described by formula $$-(OSiR^2R^3)_n-R^4,$$

$R^2$ and $R^3$ are defined as for $R^1$, $R^4$ is selected from a group consisting of C1–8 alkyls, haloalkyls, alkenyls, hydrogen atom, and hydroxyl group, and $1 \leq n \leq 1,000$; R is selected from a group consisting of hydrogen atom and C1–8 alkyls; $2 \leq x \leq 500$; $2 \leq y+z+u \leq 150$; $2 \leq y$;

$0 \leq z$; $0 \leq u \leq 15$; $0.3 \leq (y+z+u)/x \leq 3.0$; and $0 \leq u/(y+z+u) \leq 0.1$.

2. A method for branched organopolysiloxane preparation as described in claim 1 in which the alkali metal compound is an alkyllithium.

3. A method for branched organopolysiloxane preparation as described in claim 1 in which the cyclic diorganopolysiloxane is selected from a group consisting of hexamethylcyclotrisiloxane, hexaphenylcyclotrisiloxane, and tris(3,3,3-trifluoropropyl)trimethylcyclotrisiloxane.

4. A method for branched organopolysiloxane preparation as described in claim 2 in which the cyclic diorganopolysiloxane is selected from a group consisting of hexamethylcyclotrisiloxane, hexaphenylcyclotrisiloxane, and tris(3,3,3-trifluoropropyl)trimethylcyclotrisiloxane.

5. A method for branched organopolysiloxane preparation as described in claim 1 in which the triorganomonohalosilane is a silane selected from a group consisting of trimethylchlorosilane, dimethylvinylchlorosilane, and dimethylchlorosilane.

6. A method for branched organopolysiloxane preparation as described in claim 2 in which the triorganomonohalosilane is a silane selected from a group consisting of trimethylchlorosilane, dimethylvinylchlorosilane, and dimethylchlorosilane.

7. A method for branched organopolysiloxane preparation as described in claim 3 in which the triorganomonohalosilane is a silane selected from a group consisting of trimethylchlorosilane, dimethylvinylchlorosilane, and dimethylchlorosilane.

8. A method for branched organopolysiloxane preparation as described in claim 4 in which the triorganomonohalosilane is a silane selected from a group consisting of trimethylchlorosilane, dimethylvinylchlorosilane, and dimethylchlorosilane.

9. A method for branched organopolysiloxane preparation described in claim 1 in which the alkali metal compound is selected from a group consisting of methyllithium and butyllithium.

10. A method for branched organopolysiloxane preparation as described in claim 1 in which the cyclic organopolysiloxane is selected from a group consisting of cyclic trisiloxane, cyclic tetrasiloxane, and cyclic pentasiloxane.

11. A method for branched organopolysiloxane preparation as described in claim 1, where the method is conducted at a temperature within a range of about minus 80° C. to 200° C.

12. A method for branched organopolysiloxane preparation as described in claim 1, where the method is conducted at a temperature within a range of about minus 25° C. to 160° C.

13. A method for branched organopolysiloxane preparation as described in claim 1 in which x is a value within a range of 4 to 100.

14. A method for branched organopolysiloxane preparation as described in claim 1 in which y is a value within a range of 3 to 150.

15. A method for branched organopolysiloxane preparation as described in claim 1 in which $R^1$ is selected from a group consisting of methyl, phenyl, and vinyl.

16. A method for branched organopolysiloxane preparation as described in claim 1 in which n has a value within a range of one to 1,000.

17. A method for branched organopolysiloxane preparation as described in claim 1 in which $R^2$ is selected from a group consisting of methyl, phenyl, and vinyl.

18. A method for branched organopolysiloxane preparation as described in claim 1 in which $R^3$ is selected froma group consisting of methyl, phenyl, and vinyl.

19. A method for branched organopolysiloxane preparation as described in claim 1 in which $R^4$ is selected from a group consisting of hydrogen atom, hydroxyl, methyl, and vinyl.

20. A method for branched organopolysiloxane preparation as described in claim 1 in which the group $RO_{\frac{1}{2}}$ is no more than 10 percent of the total number of constituent units excluding $\{SiO_{4/2}\}$ units.

21. A method for branched organopolysiloxane preparation as described in claim 1 further comprising the presence of a solvent.

* * * * *